United States Patent
Tourapis

(10) Patent No.: US 11,368,689 B2
(45) Date of Patent: Jun. 21, 2022

(54) ADAPTIVE COLOR SPACE TRANSFORM CODING

(71) Applicant: Apple Inc., Cupertino, CA (US)

(72) Inventor: Alexandros Tourapis, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/823,064

(22) Filed: Mar. 18, 2020

(65) Prior Publication Data
US 2020/0221089 A1    Jul. 9, 2020

Related U.S. Application Data

(60) Continuation of application No. 15/680,118, filed on Aug. 17, 2017, now Pat. No. 10,602,143, which is a
(Continued)

(51) Int. Cl.
*H04N 19/12* (2014.01)
*H04N 19/70* (2014.01)
(Continued)

(52) U.S. Cl.
CPC ........... *H04N 19/12* (2014.11); *H04N 19/136* (2014.11); *H04N 19/17* (2014.11); *H04N 19/186* (2014.11); *H04N 19/625* (2014.11); *H04N 19/70* (2014.11)

(58) Field of Classification Search
CPC ...... H04N 19/12; H04N 19/186; H04N 19/70; H04N 19/17; H04N 19/625; H04N 19/136
(Continued)

(56) References Cited

U.S. PATENT DOCUMENTS

| 7,333,544 B2 | 2/2008 | Kim et al. |
| 8,036,478 B2 | 10/2011 | Kim et al. |

(Continued)

FOREIGN PATENT DOCUMENTS

| CN | 1405735 A | 3/2003 |
| CN | 101160970 A | 4/2008 |

(Continued)

OTHER PUBLICATIONS

Agawane, Pooja Vasant. Implementation and evaluation of residual color transform for 4: 4: 4 lossless RGB coding. Diss. The University of Texas at Arlington, 2008. (Year: 2008).*
(Continued)

*Primary Examiner* — Amandeep Saini
(74) *Attorney, Agent, or Firm* — BakerHostetler

(57) ABSTRACT

An encoder system may include an analyzer that analyzes a current image area in an input video to select a transform. A selectable residue transformer, controlled by the analyzer, may perform the selectable transform on a residue image generated from the current image area and a predicted current image area, to generate a transformed residue image. An encoder may encode the transformed residue image to generate output data. The analyzer controls the encoder to encode information to identify the selectable transform and to indicate that the selectable transform for the current image area is different from a transform of a previous image area of the input video. A decoder system may include components appropriate for decoding the output data from the encoder system.

5 Claims, 4 Drawing Sheets

Related U.S. Application Data division of application No. 14/931,158, filed on Nov. 3, 2015, now Pat. No. 9,769,480, which is a continuation of application No. 13/905,889, filed on May 30, 2013, now Pat. No. 9,225,988.

(51) Int. Cl.
  *H04N 19/136* (2014.01)
  *H04N 19/17* (2014.01)
  *H04N 19/625* (2014.01)
  *H04N 19/186* (2014.01)

(58) Field of Classification Search
  USPC .......................................................... 382/232
  See application file for complete search history.

(56) References Cited

U.S. PATENT DOCUMENTS

| | | |
|---|---|---|
| 8,165,392 B2 | 4/2012 | Sekiguchi et al. |
| 2004/0125130 A1 | 7/2004 | Flamini et al. |
| 2004/0252907 A1 | 12/2004 | Ito |
| 2006/0018559 A1 | 1/2006 | Kim et al. |
| 2006/0210155 A1 | 9/2006 | Sun |
| 2006/0233251 A1 | 10/2006 | Kim et al. |
| 2006/0235915 A1 | 10/2006 | Yasuoka et al. |
| 2008/0143881 A1 | 6/2008 | Tsukioka |
| 2009/0052858 A1 | 2/2009 | Date et al. |
| 2009/0168894 A1 | 7/2009 | Marpe et al. |
| 2010/0128786 A1 | 5/2010 | Gao et al. |
| 2011/0134328 A1 | 6/2011 | Tomioka et al. |
| 2011/0176614 A1 | 7/2011 | Sato et al. |
| 2011/0182357 A1* | 7/2011 | Kim ..................... H04N 19/50 375/240.12 |
| 2011/0255608 A1 | 10/2011 | Kim et al. |
| 2014/0044161 A1 | 2/2014 | Chen et al. |
| 2015/0264402 A1 | 9/2015 | Zhang et al. |
| 2015/0264405 A1 | 9/2015 | Zhang et al. |

FOREIGN PATENT DOCUMENTS

| | | |
|---|---|---|
| CN | 101356825 A | 1/2009 |
| CN | 101401437 A | 4/2009 |
| CN | 101622878 A | 1/2010 |
| CN | 102223525 A | 10/2011 |
| EP | 1176832 A2 | 1/2002 |
| EP | 1538844 A2 | 6/2005 |
| EP | 1977602 B1 | 3/2013 |
| EP | 3352459 A1 | 7/2018 |
| JP | 2001-054137 A | 2/2001 |
| JP | 2004-343774 A | 12/2004 |
| JP | 2005-160108 A | 6/2005 |
| JP | 2008-537402 A | 9/2008 |
| JP | 2009-523337 A | 6/2009 |
| JP | 2014-204347 A | 10/2014 |
| JP | 6553024 B2 | 7/2019 |
| KR | 2005-0009226 A | 1/2005 |
| TW | 201306599 A | 2/2013 |
| WO | WO 2007/034601 A1 | 3/2007 |
| WO | WO 2007/079781 A1 | 7/2007 |
| WO | WO 2013/066051 A1 | 5/2013 |

OTHER PUBLICATIONS

International Search Report and Written Opinion; dated Jul. 10, 2014, from corresponding International Application No. PCT/US2014/032481, filed Apr. 1, 2014.
Kim et al., "Inter-plane Prediction for RG8 Coding", Joint Video Team (JVT) of ISO/IEC MPEG & ITU-T VCEG; PExt Ad Hoc Group Meeting, Trondheim, Norway (ISO/IEC JTC1/SC29/WG11 and ITU-T SG16 06), No. JVT-1023, Jul. 22, 2003, pp. 1-10.
Kim et al., "Color Format Extension", 8th JVT Meeting; May 23-27, 2003; Geneva, Switzerland (Joint Video Team of ISO/IEC JTC1/SC29/WG11 and ITU-T SG.16), No. JVTH018, May 27, 2003.
Kobayashi et al.."Lossless Compression for RG8 Color Still Images", Proceedings of International Conference on Image Processing, Kobe, Japan, Oct. 24-28, 1999, IEEE, Piscataway, NJ, USA, vol. 4, Oct. 24, 1999, pp. 73-77.
K. Kawamura et al., "AHG7: Adaptive colour-space transform of residual signals", JCTVCK0193 Presentation, KDDI Corp. (KDDI R&D Labs. Inc.), Oct. 10-19, 2012, 13 pages.
K. Kawamura et al., "AHG7: In-loop color-space transformation of residual signals for range extensions", JCTVC-L0371 Presentation, KDDI Corp. (KDDI R&D Labs. Inc.), Jan. 14-23, 2013, 9 pages.
K. Kawamura et al., Input Document to JCTVC-K0193, "AHG7: Adaptive colour-space transformation of residual signals", "Joint Collaborative Team on Video Coding (JCT-VC) of ITU-T SG 16 WP 3 and ISO/IEC JTC 1/SC 29/WG 11", KDDI Corp. (KDDI R&D Labs. Inc.), 11th Meeting: Shanghai, CN, Oct. 10-19, 2012, 5 pages.
Flynn et al., Input Document to JCTVC-L0371, "AHG7: In-loop color-space transformation of residual signals for range extensions", "Joint Collaborative Team on Video Coding (JCT-VC) of ITU-T SG 16 WP 3 and ISO/IEC JTC 1/SC 29/WG 11", 12th Meeting: Geneva, CH, Jan. 14-23, 2013, 313 pages.
Flynn et al., "High Efficiency Video Coding (HEVC) Range Extensions text specification: Draft 5", Joint Collaborative Team on Video Coding (JCT-VC) of ITU-T SG 16 WP 3 and ISO/IEC JTC 1/SC 29/WG 11, 15th Meeting: Geneva, CH, Oct. 23-Nov. 1, 2013, 346 pages.
Flynn et al., "High Efficiency Video Coding (HEVC) Range Extensions text specification: Draft 2 (for PDAM)", Joint Collaborative Team on Video Coding (JCT-VC) of ITU-T SG 16 WP 3 and ISO/IEC JTC 1/SC 29/ WG 11, 12th Meeting: Geneva, CH, Jan. 14-23, 2013, 313 pages.
Khairat et al., "AHGS and AHG8: Extended Cross-Component Decorrelation for Animated Screen Content", Joint Collaborative Team on Video Coding (JCT-VC) of ITU-T SG 16 WP 3 and ISO/IEC JTC 1/SC 29/ WG 11, 16th Meeting: San Jose, US, Jan. 9-17, 2014, 2 pages.
Chen et al., "High Efficiency Video Coding (HEVC) Scalable Extensions Draft 5", Joint Collaborative Team on Video Coding (JCT-VC) of ITU-T SG 16 WP 3 and ISO/IEC JTC 1/SC 29/WG 11, 16th Meeting: San Jose, US, Jan. 9-17, 2014, 125 pages.
K. Kawamura et al., Output Document of JCTVC-L 1005, "High Efficiency Video Coding (HEVC) Range Extensions text specification: Draft 2 (for PDAM)", "Joint Collaborative Team on Video Coding (JCT-VC) of ITU-T SG 16 WP 3 and ISO/IEC JTC 1/SC 29/WG 11". KDDI Corp. (KDDI R&D Labs. Inc.), 12th Meeting: Geneva, CH, Jan. 14-23, 2013, 4 pages.
Wei et al.; "RCE1: Adaptive Color Transforms for Range Extensions"; Joint Collaborative Team on Video Coding (JCT-VC) of ITU-T SG16 WP3 and ISO/IEC JTC1/SC29/WG11; Document No. JCTVC-M004841; Apr. 2013; 12 pages.
Kim; "Color Format Extension"; Joint Video Team of ISO/IEC JTC1/SC29/WG11 and ITU-T SG.16; No. JVT-H018; May 2003; 17 pages.
European Patent Application No. 18157340.3; Extended Search Report; dated May 28, 2018; 8 pages.
Sullivan et al.; "Overview of the High Efficiency Video Coding (HEVC) Standard"; IEEE Transactions on Circuits and Systems for Video Technology; vol. 22; Dec. 2012; p. 1649-1668.
Tanaka et al.; "Improved image concentration for artifact-free image dilution and its application to image coding"; IEEE Int'l Conf. on Image Processing; 2010; (Abstract Only).

* cited by examiner

100

300

400

ADAPTIVE COLOR SPACE TRANSFORM CODING

CROSS-REFERENCE TO RELATED APPLICATIONS

This application is a continuation of U.S. patent application Ser. No. 15/680,118, filed on Aug. 17, 2017, which is a divisional of U.S. patent application Ser. No. 14/931,158, filed on Nov. 3, 2015, now U.S. Pat. No. 9,769,480, issued Sep. 19, 2017, which is a continuation of U.S. patent application Ser. No. 13/905,889, filed on May 30, 2013, now U.S. Pat. No. 9,225,988, issued Dec. 29, 2015, which are incorporated herein by reference in their entirety.

BACKGROUND

Image data, such as those contained in a video, may contain large amount of information relating to color, pixel location, and time. In order to handle such large amount of information, it may be necessary to compress or encode the image data, without losing too much information from the original video, while at the same time, without increasing the complexity of the data compression, which might decrease the speed of image data processing. Encoded image data may need to be decoded later to convert back or restore the original video information.

To encode an image, pixel color data may be first transformed to color data in an appropriate color-space coordinate system. Then, the transformed data is encoded. For example, the image data may have raw pixel color data in a Red-Green-Blue (RGB) color space coordinate system. To encode the image data, the raw pixel color data in RGB color space may be transformed into color data in a YCbCr color space coordinate system, by separating the luminance component and the color component. Then, the color data in YCbCr color space coordinate system may be encoded. By doing so, redundant information that might exist between the original three colors may be compressed by removing the redundancy during the color space transform.

Additional redundancies in the image data may be removed during the encoding of the transformed image data, by performing spatial prediction and temporal prediction, followed by additional encoding of any remaining residual data to any extent that is desirable, as well as by entropy encoding of the data in an individual frame in a point in time and/or of the data in a duration of the video sequence. Spatial prediction may predict image data in a single frame in time to eliminate redundant information between different pixels in the same frame. Temporal prediction may predict image data in a duration of the video sequence to eliminate redundant information between different frames. A residue image may be generated from the difference between the non-encoded image data and the predicted image data.

Some color space formats, such as RGB 4:4:4, may be less efficient to code natively since the different color planes may have not been effectively de-correlated. That is, redundant information may exist between different components that may not be removed during encoding, resulting in a reduced coding efficiency versus an alternative color space. On the other hand, it may be undesirable to encode this material in an alternative color space such as YUV 4:4:4 or YCoCg and YCoCg-R 4:4:4 in some applications, because of the color transformation that may have to be performed outside the coding loop, as well as possible losses that may be introduced through the color transformation.

Thus, there is a need for an improved way of transforming and encoding image data efficiently.

DETAILED DESCRIPTION

Figure 1:
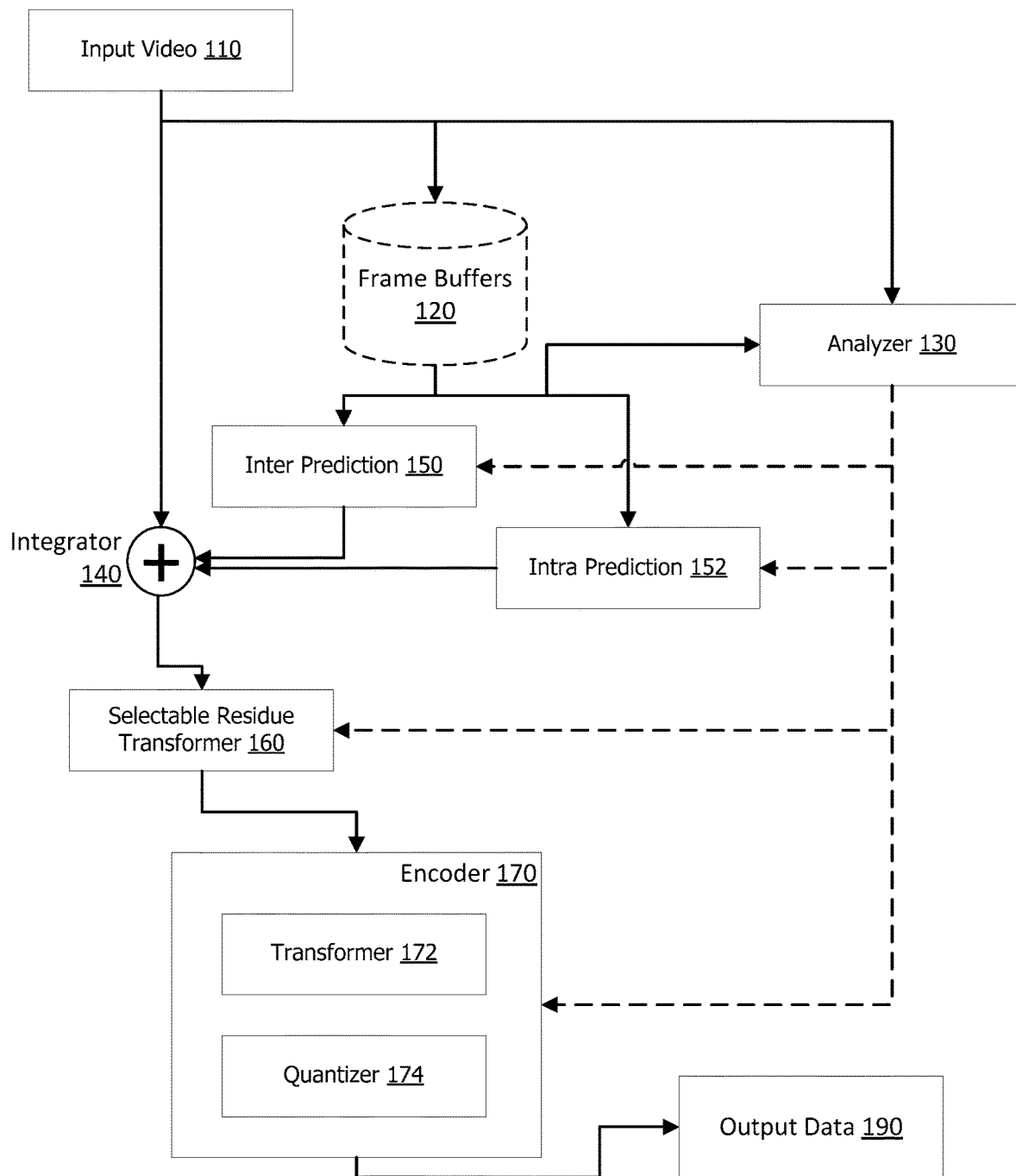
FIG. 1 illustrates an encoding system according to an embodiment of the present disclosure.

According to an embodiment as illustrated in FIG. 1, a system 100 may include an analyzer 130, a selectable residue transformer 160, and an encoder 170.

The analyzer 130 may analyze a current image area in an input video 110 to select a transform. The selectable residue transformer 160 may be controlled by the analyzer 130, to perform the selectable transform on a residue image generated from the current image area and a predicted current image area, to generate a transformed residue image. The encoder 170 may encode the transformed residue image to generate output data 190. The analyzer 130 may control the encoder 170 to encode information to identify the selectable transform and to indicate that the selectable transform for the current image area is different from a transform of a previous image area of the input video.

Optionally, the system 100 may include frame buffers 120 to store information of input video 110, for example, image data previously processed. Such data in frame buffers 120 may be used by inter prediction 150, controlled by the analyzer 130, to perform temporal predictions, i.e. generating predicted image data for the current image area based upon the data of a previous frame. Or such data in frame buffers 120 may be used by intra prediction 152, controlled by the analyzer 130, to perform spatial predictions, i.e. generating predicted image data for the current image area based upon the data of another portion of the current frame. Optionally, the analyzer 130 may perform its analysis based upon the data stored in the frame buffers 120. Predicted image area for the current image area generated by the inter prediction 150 and/or the intra prediction 152 may be combined with (or subtracted from) the current image area of the input video 110 by an integrator 140, to generate the residue image.

According to an embodiment, the current image area may be one of a frame, a slice, and a coding tree unit. The selectable transform may include a color-space transform. The encoder 170 may include an entropy encoder. The encoded information identifying the selectable transform may specify coefficients of a selectable inverse transform. The encoded information identifying the selectable transform may be contained in one of a sequence parameter set, a picture parameter set, and a slice header, preceding encoded residue image data of the current image area. The encoder 170 may include a transformer 172 and/or a quantizer 174, which may be controlled by the analyzer 130 to perform quantization.

The analyzer 130 may select and change the selectable transform for the selectable residue transformer 160 and alter parameters accordingly, for example for inter prediction 150, intra prediction 152, and encoder 170, to optimize for data encoding, data decoding, encoded data size, error rate, and/or system resources required for encoding or decoding.

The next generation High Efficiency Video Coding (HEVC) standard introduced several new video coding tools in an effort to improve video coding efficiency versus previous video coding standards and technologies such as MPEG-2, MPEG-4 part2, MPEG-4 AVC/H.264, VC1, and VP8 among others.

The new standard may support the encoding of YUV 4:2:0 8 or 10 bit material using well defined profiles, for example, the Main, Main 10, and Main Still Picture profiles. There is considerable interest in professional applications, such as cinema applications, capture, video editing, archiving, gaming, and consumer applications, especially for screen content compression and sharing, to develop formats to support higher (more than 10 bits) sample precision (bit-depth) as well as different color sampling formats and color spaces, including YUV or RGB 4:4:4.

Encoding principles of higher color sampling formats/spaces may be similar to those of formats with less sampling precision, i.e. 4:2:0 YUV, to appropriately handle the difference in resolution for the chroma components. One of the color components may be perceived as equivalent to the luma component in the 4:2:0 YUV encoding, whereas the remaining color components may be handled similarly as the chroma components, while accounting for the higher resolution. That is, prediction tools such as intra prediction and motion compensation, need to account for the increment in resolution, and the transform and quantization processes, also need to handle additional residual data for the color components. Similarly, other processes such as entropy coding, deblocking and the sample adaptive offset (SAO) among others, may need to be extended to process the increase in video data. Alternatively, all color components may be encoded separately as separate monochrome images, with each color component taking the role of the luma information during the encoding or decoding processes.

To improve coding performance, an additional color space transformation may be performed on the residual data that may result in better de-correlation (less redundancy) between all color components. The selectable color space transformation may be applied on dequantized (inverse quantized) and inverse-transformed residual data using an adaptively derived color-space transform matrix, such as:

$$\begin{bmatrix} a & b & c \\ d & e & f \\ g & h & i \end{bmatrix}^t \begin{bmatrix} P' \\ Q' \\ R' \end{bmatrix} = \begin{bmatrix} G' \\ B' \\ R' \end{bmatrix}$$

The color transform matrix may be derived using previously restored image data, such as image data on the left or above of the current transform unit or image data of the transform unit in the previous frames. The derivation may involve normalizing the reference samples in each color plane by subtracting their mean and by computing and normalizing a covariance matrix across all color planes. This may achieve some "localized" coding performance benefits, without adding any new signaling overhead in the HEVC specification. However, this may add complexity in both encoder and decoder for the derivation of the transformation parameters.

To simplify the adaptive color transform in video encoding and decoding, the color transforms are only applied on residual data. Additional color transforms may be selectable and signaled by the encoder, and the decoder may select and perform the corresponding inverse color transform based upon the signaling decoded from the encoded data, according to the present invention.

In particular, one or more color transforms may be implicitly or explicitly signaled at different levels within a codec such as HEVC. For example, an encoder may implicitly signal known color transforms, such as transforms in the limited or full range YUV Rec.709, Rec.2020, or Rec.601, as well as YCoCg, from the RGB color space. An encoder may explicitly signal color transforms, by signaling or specifying all inverse color transform coefficients with a predefined precision, for example, by listing the transform coefficients or their relationships in portions of the encoded data. Color transforms, including the types, the parameters, and the coefficients, may be signaled or specified within the Sequence Parameter Set (SPS) NALU, the Picture Parameter Sets (PPS), and/or a Slice header. Signaling within a Coding Tree Unit (CTU) may also be possible, although that may cost a bit more in terms of bitrate, which may not be desirable.

If such transform information is specified for different levels of the video sequence, i.e. sequence, frame, and pixel block of a CTU, then the transforms may be predicted within the hierarchy of these elements. That is, a transform in the PPS may be predicted from transforms defined in the SPS, and transforms in the slice header may be predicted from transforms in the PPS and/or the SPS. New syntax elements and units may be defined and used to allow this prediction of transforms between different levels of the video sequence hierarchy, to include the prediction or non-prediction of the transform from specified transforms or higher level transforms, as well as for the prediction or non-prediction of the precision of the transform coefficients and the coefficients themselves. Derivation of an explicitly defined color transform may be based on data available, such as sample data from the entire sequence, picture, slice, or CTU. An encoder may choose or select to use data that correspond to current pixel samples if available, or use data from past frames or units that have already been encoded. A principal component analysis method, e.g. a covariance method, iterative method, non-linear iterative partial least squares, etc., may be used to derive the transform coefficients.

A system may dictate that only a single transform shall be used for the entire sequence, thus not permitting any change of the color transform within any subcomponents of the sequence, i.e. within a picture, a slice, CTU, or a Transform Unit (TU), through signaling or semantics (i.e. forced by the codec or profile/level). A similar restriction may be performed at a lower level, i.e. within a picture, slice, or CTU.

However, it may also be possible for a system to allow switching of color transforms within a sequence, picture, slice, or even CTU. Switching of color transforms for every picture and slice may be done by signaling new color transform parameters for each new data block that override the higher level or previous block transform parameters. Additional transform parameters may be signaled at a lower layer, effectively allowing switching of the color transform for an entire CTU, Coding Unit (CU), or even TU. However such signaling may take up a significant number of bits in the resulting encoded data stream, thus increasing the data stream size.

Alternatively, the color transform may be derived based on a variety of predefined or signaled conditions in the bitstream. In particular, a particular color transform may be pre-assigned to a specific transform block size, coding unit size, or prediction mode (e.g. intra vs inter). For example, assuming that transform units of luma and chroma data are aligned for a particular video sequence, if the size of the luma transform that is to be used is 16×16, then Color transform A is used, if 8×8 luma transform is to be used, color transform B is used, and for 32×32 or 4×4 transforms no color transform is applied. If the transform units of luma and chroma data are not aligned, then alternative but similar ways of pre-defining conditional derivation of color transforms may be used to account for the misalignment of transform units.

A system may buffer or cache a number of pre-defined color transforms along with associated processing algorithms, in encoding or decoding, such that the system may store a codebook that it can look up the pre-defined color transforms, for example via a lookup table (LUT). The system may also compute or predict color transforms and store them in the buffer for later lookup.

In some codec standards, prediction units (PUs) and TUs may be defined within a CU with no strict dependency between the two. Thus, prediction units (PUs) and TUs may not be directly related in terms of size. In other codec standards, if TUs are defined as strictly within PUs, then PU information, such as prediction list and reference indices, may be used to derive the color transform.

For systems where complexity is not a concern, then a combination of the above methods may be used. That is, for every CTU, CU, or transform block, the encoder may signal in the encoded data stream whether to use a previously defined/signaled color transformed, or whether the color transform should be derived separately for the current unit based on neighborhood information. This allows the system to control the complexity of the decoder and to avoid cases where there is insufficient information to derive the color transform from its neighbors. This may be especially true around object or color boundaries or noisy data, where neighborhood data may be uncorrelated. The adaptively computed color transform may be computed and updated at less frequent intervals, e.g. every CTU row or even for every CTU, to reduce decoder complexity. Stability of the color transform may be increased by slowly adapting the color transform using previously generated values. That is, the computation of the current color transform at unit (e.g. Transform Unit) n, may be performed as:

$$\text{Transform}(n) = w_0 * \text{Transform}(n-1) + w_1 * \text{ComputedTransform}(n)$$

Where the ComputedTransform(n) is the transform that is estimated purely based on local pixel group information. The two weights, $w_0$ and $w_1$, may be predefined or signaled in the system providing further flexibility on how to control the computation of the color transform. That is, increasing the value of $w_0$ relative to $w_1$, increases the dependence of resulting color transform Transform(n) on a neighboring color transform Transform(n-1).

An encoding system may determine all of the transforms needed to encode a video sequence, by for example, analyzing the image data in the video sequence and perform cost-benefit evaluation to optimize the encoding, the decoding, quality of data, and/or size of encoded data. For example, if the encoding system has sufficient computational resources, then it may perform a "brute force" analysis, by performing multiple possible color transforms on all individual frames and transform units, and then select one color transform for each transform unit that results in the least rate distortion, if rate distortion is to be optimized. However, such a "brute force" analysis would require a lot of computational resources, and would be slow, and thus it may not be useful in an application where encoding needs to be done in near "real time", for example, in "live" video streaming.

The usage of different color transforms per block may impact other portions of the encoding and decoding process. In particular, the entropy coding, e.g. based on the context adaptive binary arithmetic coding (CABAC), assumes that coefficients in neighboring blocks are in the same color domain, the statistics for the entropy coding process may be accumulated accordingly, and deblocking may utilize the quantization parameters (QP) used for each color component when filtering block edges.

However, this may not be the case in a system that uses block level adaptive color transforms which may impact coding performance. In the case of entropy coding, the impact may be trivial and thus the difference in color space may be ignored. Limiting the process in considering neighboring data that are in the same color space may penalize performance in terms of complexity and implementation, because more contexts may need to be handled and compensated for each new color transform that may have been used. Thus, the system may not need to alter the encoding process for the adaptive color transforms.

On the other hand, adaptive color transform changes may be easier to account for during deblocking. In particular, when deriving the appropriate thresholds for each color component for deblocking, the signaled QP values may be used while ignoring the color space used, or the QP values may be approximated in the native color domain given the QP values used for coding the transformed residual. For example, a simple way is to apply the same color transform that is applied on the residual data to also the quantizer values, or define and signal an additional transform that would help translate the used quantizer values for the transformed residuals to native color space quantizer values. For simplicity, the system may not need to translate or adjust quantization values for the adaptive color transforms.

Figure 2:
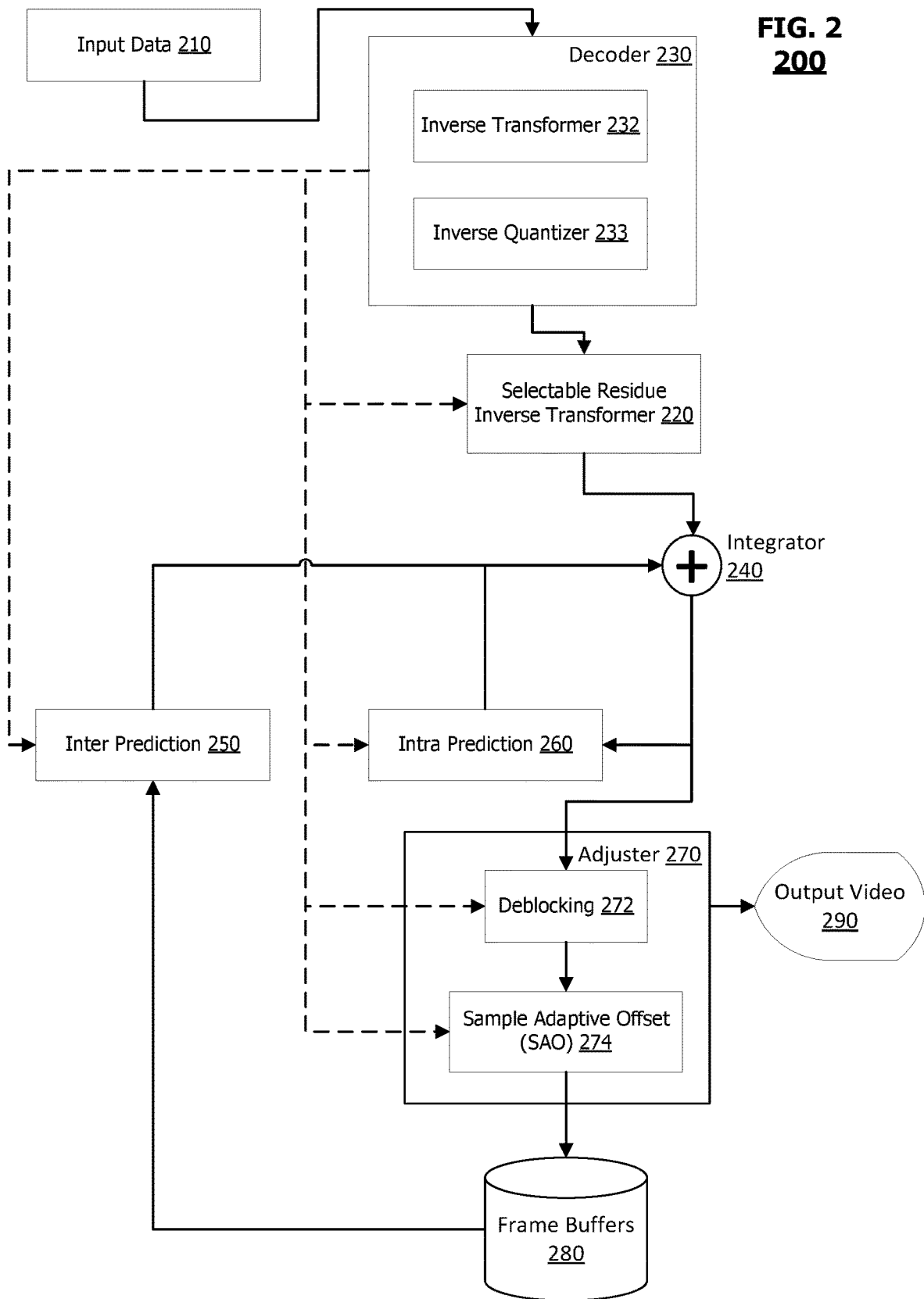
FIG. 2 illustrates a decoding system according to an embodiment of the present disclosure.

According to an embodiment as illustrated in FIG. 2, a system 200 may include a decoder 230, a selectable residue inverse transformer 220, and an integrator 240.

The decoder 230 may receive and decode input data 210. The selectable residue inverse transformer 220 may be controlled by the decoder 230, to perform a selectable inverse transform on the decoded input data, to generate an inverse transformed residue image. The integrator 240 may combine the inverse transformed residue image with a predicted image for a current image area to generate a restored current image area of an output video 290. The decoder 230 may select the selectable inverse transform based upon encoded information in the input data 210, the encoded information identifies the selectable inverse transform and indicates that the selectable inverse transform for the current image area is different from a transform of a previous image area of the output video 290.

Optionally, the system 200 may include frame buffers 280 to store information of output video 290, for example, image data previously processed. Such data in frame buffers 280 may be used by inter prediction 250, controlled by the decoder 230, to perform temporal predictions, i.e. generating predicted image data for the current image area based upon the data of a previous frame. Intra prediction 260 may be controlled by the decoder 230 to perform spatial predictions, i.e. generating predicted image data for the current image area based upon the data of another portion of the current frame. Predicted image area for the current image area generated by the inter prediction 250 and/or the intra prediction 260 may be combined with (or added with) the inverse transformed residue image, from selectable residue inverse transformer 220, by the integrator 240, to generate the restored current image area of the output video 290. The system 200 may include an adjuster 270, which performs adjustments of restored current image area for the output video 290. The adjuster 270 may include deblocking 272 and sample adaptive offset (SAO) 274. The adjuster 270 may output to the output video 290 and/or the frame buffers 280.

According to an embodiment, the current image area may be one of a frame, a slice, and a coding tree unit. The selectable inverse transform may include a color-space transform. The decoder 230 may include an entropy decoder. The encoded information identifying the selectable inverse transform may specify coefficients of a selectable inverse transform. The encoded information identifying the selectable inverse transform may be contained in one of a sequence parameter set, a picture parameter set, and a slice header, preceding encoded residue image data of the current image area. The decoder 230 may include an inverse transformer 232 and/or an inverse quantizer 234, which may perform quantization. The output video 290 may be connected to a display device (not shown) and displayed.

The decoder 230 may select and change the selectable inverse transform for the selectable residue inverse transformer 220 and alter parameters accordingly, for example for inter prediction 250, intra prediction 260, and adjuster 270, based upon encoded information in the input data received identifying the selectable inverse transform.

Figure 3:
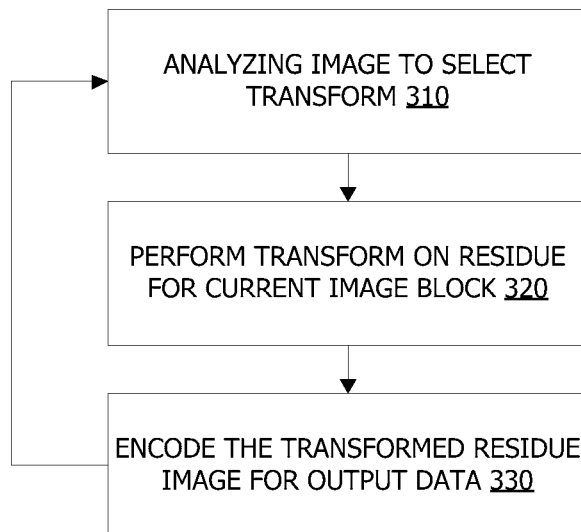
FIG. 3 illustrates an encoding method according to an embodiment of the present disclosure.

FIG. 3 illustrates a method 300 according to an embodiment.

The method 300 may include block 310, analyzing, by an analyzer, a current image area in an input video to select a transform.

At block 320, performing, by a selectable residue transformer controlled by the analyzer, the selectable transform on a residue image generated from the current image area and a predicted current image area, to generate a transformed residue image.

At block 330, encoding, by an encoder, the transformed residue image to generate output data.

According to an embodiment, the analyzer may control the encoder to encode information to identify the selectable transform and to indicate that the selectable transform for the current image area is different from a transform of a previous image area of the input video.

According to an embodiment, the analyzer may analyze the input video and select an overall sequence color transform for the entire video sequence, and analyze and select residue color transforms for individual frames, slices, pixel blocks, CTUs, etc. The analyzer may continually analyze the input video, and perform selecting of the color transform in-situ for each frame as the input video is received and encoding is processed. Or the analyzer may analyze the entire input video sequence completely before selecting the color transforms and beginning the encoding.

Figure 4:
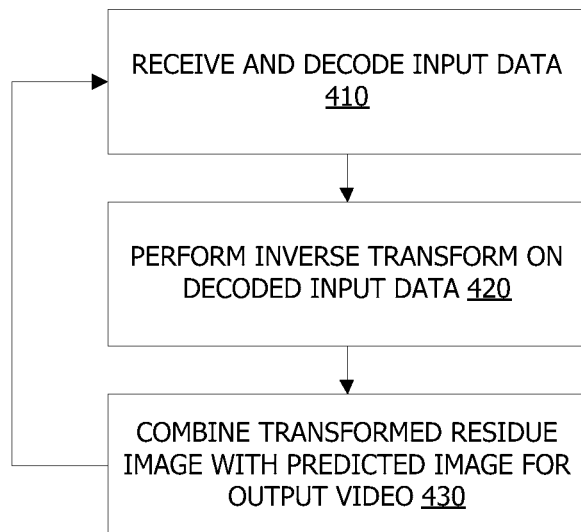
FIG. 4 illustrates a decoding method according to an embodiment of the present disclosure.

FIG. 4 illustrates a method 400 according to an embodiment.

The method 400 may include block 410, receiving and decoding, by a decoder, input data.

At block 420, performing, by a selectable residue inverse transformer controlled by the decoder, a selectable inverse transform on the decoded input data, to generate an inverse transformed residue image.

At block 430, combining, by an integrator, the inverse transformed residue image with a predicted image for a current image area to generate a restored current image area of an output video.

According to an embodiment, the decoder may select the selectable inverse transform based upon encoded information in the input data, the encoded information identifies the selectable inverse transform and indicates that the selectable inverse transform for the current image area is different from a transform of a previous image area of the input video.

It is appreciated that the disclosure is not limited to the described embodiments, and that any number of scenarios and embodiments in which conflicting appointments exist may be resolved.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

The present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed:

1. A system for video encoding comprising:
    an integrator that combines source image data with predicted image data to generate residual image data for a current image area, wherein the current image area is a transform unit (TU) and a TU is a partition of a coding unit (CU);
    a selectable residual transformer that performs a selected color transform on the residual image data to produce transformed residual image data;
    an encoder that encodes the transformed residual image data into an encoded bitstream including an indication of the selected color transform in a TU syntax element within the encoded bitstream, wherein the TU syntax element is at a lower syntax layer in a syntax layer hierarchy than a CU syntax layer and a coding tree unit (CTU) syntax layer.

2. The system of claim 1, wherein a first color component of the transformed residual image data is produced based on only one color component of the residual image data, and the other color components of the transformed residual image data are predicted based on the first color component of the residual image data.

3. The system of claim 1, wherein image data in the encoded bitstream is split into individual color components, and wherein processing paths for each color component are separate from each other.

4. The system of claim 1, wherein the encoder includes an entropy encoder.

5. The system of claim 1, wherein the TU syntax element indicating the selected color transform specifies color transform parameters.

* * * * *